United States Patent
Kasha

(12) 
(10) Patent No.: US 6,507,705 B1
(45) Date of Patent: Jan. 14, 2003

(54) GUIDING MECHANISM FOR MOVING PARTS IN ZOOM LENS

(75) Inventor: Vladislav Kasha, Rochester, NY (US)

(73) Assignee: Optical Gaging Products, Inc., Rochester, NY (US)

(*) Notice: Subject to any disclaimer, the term of this patent is extended or adjusted under 35 U.S.C. 154(b) by 112 days.

(21) Appl. No.: 09/609,750

(22) Filed: Jul. 3, 2000

(51) Int. Cl.[7] .............................. G03B 17/00; G03B 7/02
(52) U.S. Cl. ........................ 396/72; 396/85; 359/822; 359/823
(58) Field of Search .......................... 396/72, 73, 74, 396/75, 529, 85; 359/822, 819, 823, 704

(56) References Cited

U.S. PATENT DOCUMENTS 5,510,936 A * 4/1996 Aoki et al. ................. 359/822
6,008,958 A * 12/1999 Ishikawa et al. ............ 359/824

* cited by examiner

Primary Examiner—Alan A. Mathews
Assistant Examiner—Arthur A Smith
(74) Attorney, Agent, or Firm—Shlesinger, Fitzsimmons & Shlesinger

(57) ABSTRACT

Three elongate, circular rods are secured to the inner peripheral surface of a lens barrel to extend axially thereof and in angularly spaced relation to each other. Each of two cylindrically shaped lens housings is mounted coaxially in the barrel for axial adjustment therein by means of three sets of rollers, each of which sets is mounted on the housing to have rolling, point engagement with a different one of the rails. At least one set of rollers on each housing is urged resiliently into rolling engagement with the associated rail, and each housing is connected to one of two camming rings which is rotatably mounted on the barrel to effect axial adjustment of the housings.

14 Claims, 2 Drawing Sheets

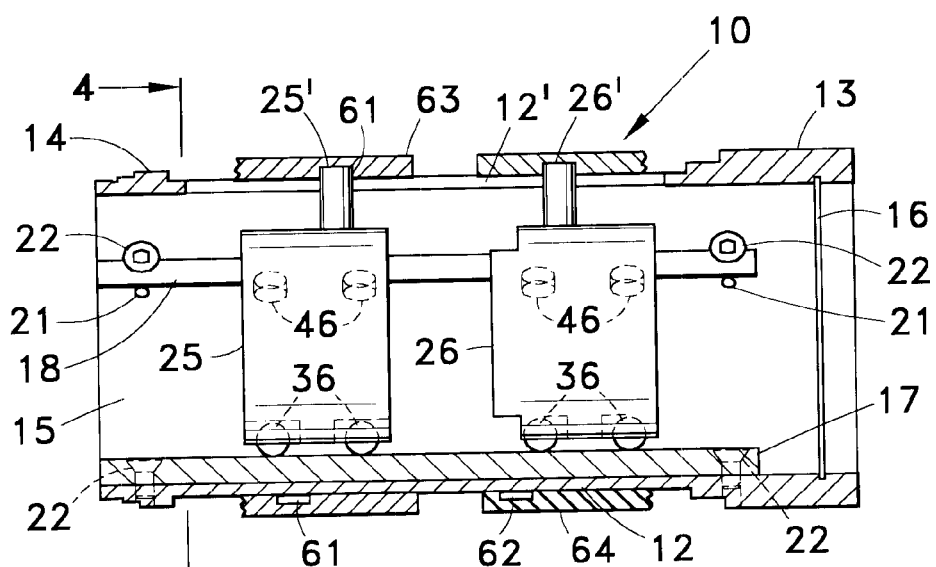
FIG. 3
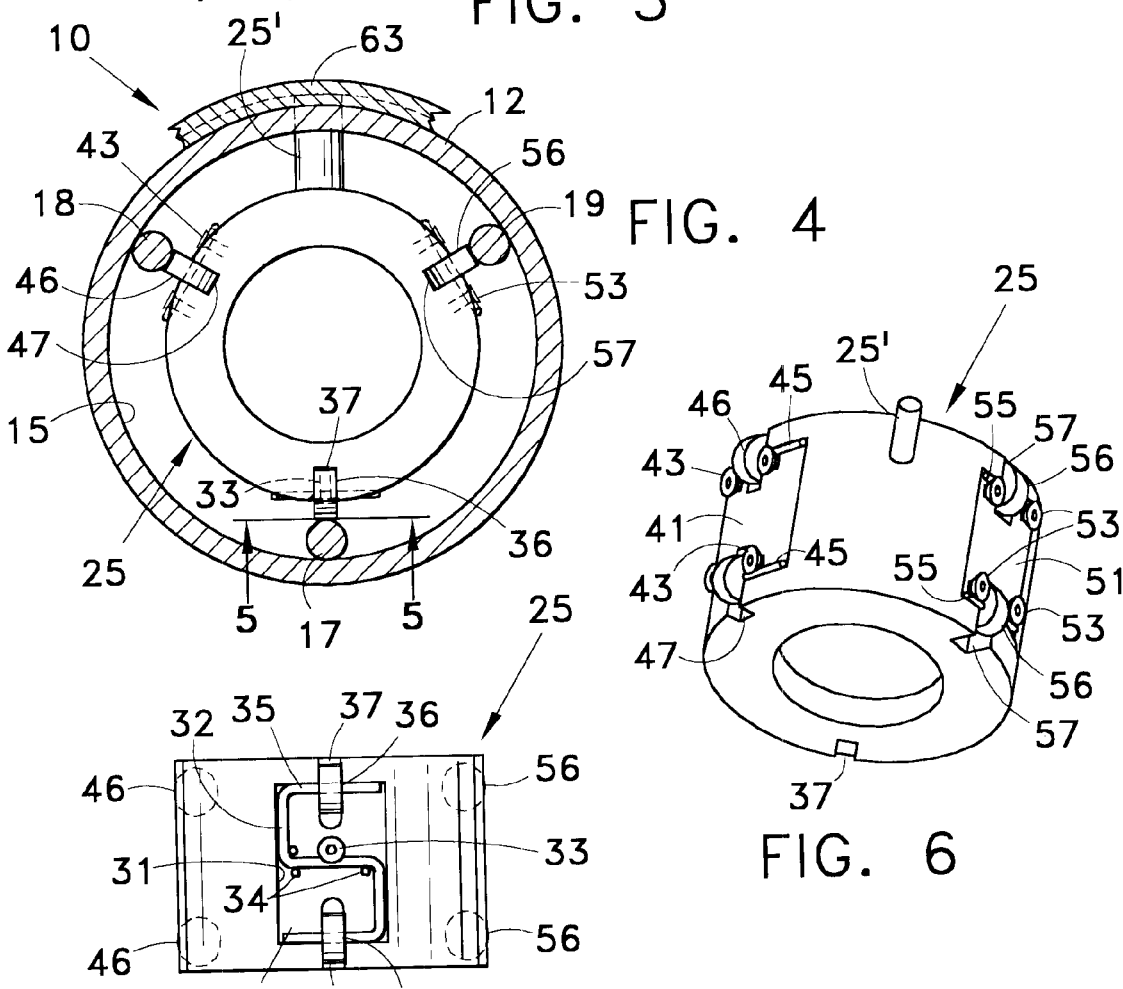
FIG. 4
FIG. 6
FIG. 5

GUIDING MECHANISM FOR MOVING PARTS IN ZOOM LENS

BACKGROUND OF THE INVENTION

This invention relates to optical zoom lens systems, and more particularly to an improved guiding mechanism for controlling the moving parts or elements in such a lens system. It has long been customary in zoom lens systems of the type described, to employ ball bearing rollers for guiding moving parts of a zoom lens within the lens barrel. It has also been customary heretofore to employ in such lens barrel various parts which are mounted for sliding movement relative to each other to effect variation in magnification of an observed object. Lenses of the type described are frequently employed in motion picture photography and television broadcasting, which usually demand the highest of image quality. Typically such a zoom lens system includes in the lens barrel two movable sets of lenses, the first or forward group of lenses being disposed to vary the angle of view, the second set being operative to restore the focus upon adjustment of the first group.

Among the disadvantages of prior such zoom lenses has been the difficulty encountered in accurately, and in some instances quietly, moving the respective sets of lenses. Such prior art devices also require a nearly polished finish on the inner bore wall of the lens barrel, thus contributing significantly to the manufacturing costs of the lens systems.

Accordingly, it is an object of this invention to provide an improved optical zoom lens system of the type described in which the lenses can be moved accurately and with precision not heretofore available.

Still another object of this invention is to provide an improved guiding mechanism for moving parts of an optical zoom lens system of the type described, which mechanism is easier to manufacture and is longer lasting than prior such guiding mechanisms.

Other objects of the invention will be apparent hereinafter from the specification and from the recital of the appended claims, particularly when read in conjunction with the accompanying drawings.

SUMMARY OF THE INVENTION

The tubular barrel of a zoom lens mechanism has secured in the bore thereof a plurality (three in the embodiment illustrated) of elongate, circular rods which are secured to the inner peripheral surface of the barrel to extend axially thereof and in angularly spaced relation to each other. Each of a plurality of cylindrically shaped lens housings are mounted coaxially in the bore of the barrel for axial adjustment therein by means of a plurality of sets of rollers on each housing, each of which sets on each housing has rolling, point engagement with a different one of the rails. One set of rollers on each housing is urged resiliently into rolling engagement with the associated rail, while the other two sets of rollers in such housing are rotatable about axes which are fixed with respect to the associated housing. Each housing has thereon a pin which projects through a slot in the barrel and into a cam groove formed in one of two different zoom or camming rings which are rotatably mounted on the barrel. The rolling point contact between the rails and the rollers on the housing, significantly improve the accuracy and life of the mechanism.

THE DRAWINGS

FIG. 3 is a fragmentary sectional view taken generally along the line 3—3 in FIG. 2 looking in the direction of the arrows, the two lens housings, however, being shown in full;

FIG. 4 is a slightly enlarged sectional view taken generally along the line 4—4 in FIG. 3 looking in the direction of the arrows, and illustrating an end view of one of the two lens housings mounted for adjustment in the lens barrel;

FIG. 5 is a bottom plan view of the lens housing shown in FIG. 4, when viewed along the line 5—5 in FIG. 4 looking in the direction of the arrows; and FIG. 6 is a perspective view of the lens housing shown in FIG. 5 when such housing is viewed from the side thereof diametrally opposite to the surface shown in FIG. 5.

DETAILED DESCRIPTION OF THE PREFERRED EMBODIMENTS

Figure 1:
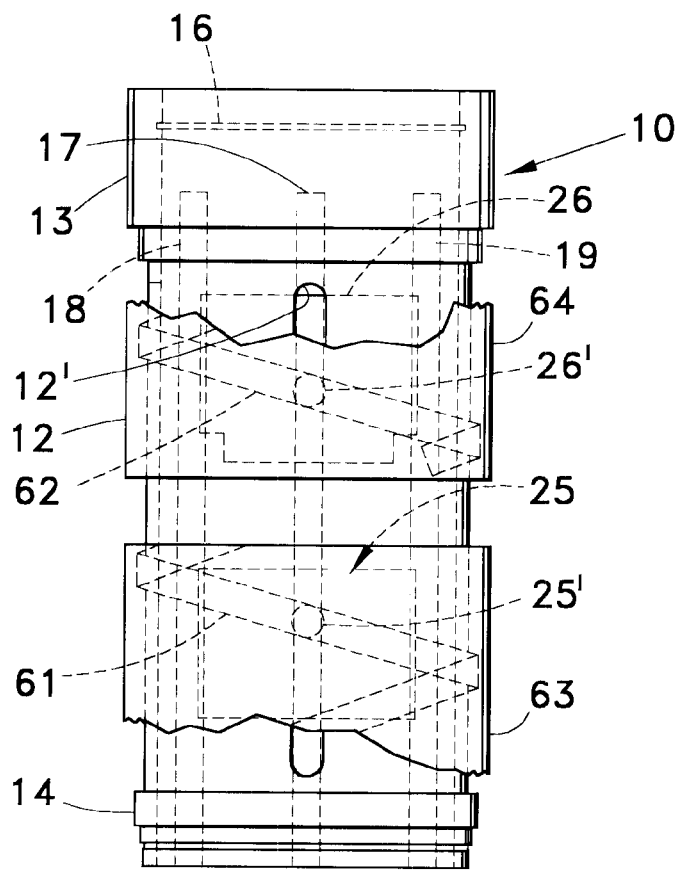
FIG. 1 is an elevational view of an elongate cylindrical lens barrel containing two zoom lens housings or cells and the improved mechanism for adjusting the housings longitudinally of the lens barrel, the zoom ring containing the cam slots for manipulating the lens housings being shown only fragmentarily.
Figure 2:
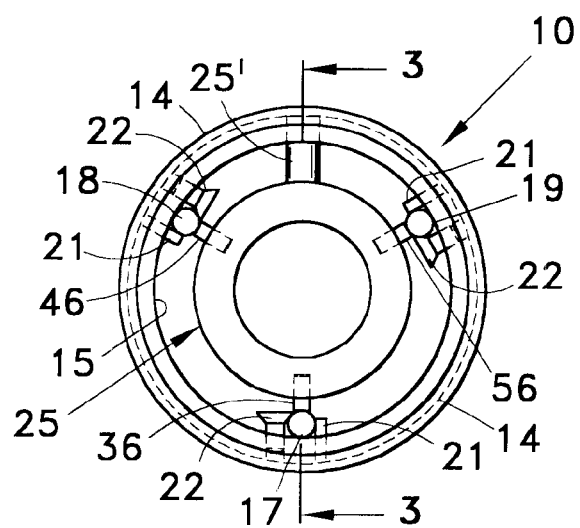
FIG. 2 is an end view of the lens barrel and associated parts as seen when looking in the lower end of the lens barrel as shown in FIG. 1.

Referring now to the drawings by numerals of reference, 10 denotes generally a tubular lens barrel having intermediate its ends an elongate tubular section 12 of uniform outer diameter, and extending between circumferential flange sections 13 and 14 of slightly larger diameter that are formed on opposite ends respectively of barrel 10. Barrel 10 has therethrough an axial bore defining in the barrel an inner, annular bore wall 15 having therein an annular recess 16 for use in mounting in one end of the barrel a front lens (not illustrated) of conventional design. The bore wall 15 has releasably secured thereagainst, and at equi-angularly spaced points about the axis thereof, three elongate, cylindrical guide rods 17, 18 and 19, which extend parallel to each other and longitudinally of barrel 10.

To secure the rods 17–19 to wall 15, barrel 10 has fixed therein, and adjacent each end thereof, three, similarly shaped, locating pins 21, which are secured at one end in the barrel 10 and project at their opposite ends radially inwardly from the bore wall 15 at equi-angularly spaced points thereabout. Adjacent opposite ends thereof each of the rods 17, 18 and 19 has one diametral side thereof seated against a pair of the pins 21, as shown for example in FIG. 3, and is engaged at its diametrally opposite side by the cone-shaped heads of two screws 22, the shanks of which are releasably threaded into the bore wall 15. Thus, each of the guide rods 17, 18 and 19 is secured in a stationary position against a pair of pins 21 by the cone-shaped heads of a pair of screws 22.

Mounted for axial adjustment within the bore of barrel 10 are two cylindrically shaped lens housings or cells, which are denoted generally by the numerals 25 and 26. The lenses and mountings therefor in housings 24 and 25 may be of conventional design and therefore are not described in detail herein. In a manner to be described in greater detail hereinafter, each of the lens housings 25 and 26 is supported on the three guide rods 17, 18 and 19 for axial adjustment selectively in opposite directions in the lens barrel 10. The means for supporting the respective housings 25 and 26 on the guide rods 17–19 is the same for each housing, so the mounting means will be described in detail in connection with the housing 25, but it will be understood that the housing 26 will be supported in the same manner for movement on the guide rods 17–19.

Referring now to FIGS. 4 to 6, and first to FIG. 5, the housing 25 has formed in the outer peripheral surface which confronts upon the guide rod 17, a rectangularly shaped recess 31 having a flat or planar bottom surface. The midsection of a generally S-shaped spring rod 32 is secured against the bottom of recess 31 by the cone-shaped head of a screw 33, the shank of which is threaded into the bottom of recess 31 to urge the midsection of the spring 32 against a pair of pins 34 which are fixed to and project upwardly from the bottom of recess 31. Spring element 32 has spaced, parallel end sections 35 each of which is supported resiliently outwardly from the bottom of recess 31, and has rotatably mounted thereon a roller 36, which rotates in a registering recess 37 formed in the adjacent end of the housing 25. As shown in FIGS. 3 and 4, the rollers 36 are thus urged by the spring element 32 resiliently into rolling engagement with the peripheral surface of the guide rod 17, whereby the rollers 36 in effect, have point contact with the periphery of the guide rod 17. As noted above, the mounting and guide means for the lens housing 26 are the same as for the housing 25, so that as indicated in FIG. 3, housing 26 has a similar set of rollers 36 that have rolling engagement with guide rod 17.

In addition to the recess 31, housing 25 has therein in its outer peripheral surface two additional, rectangular recesses 41 and 51, respectively. The center of recess 41 is angularly spaced from the center of the recess 31 by 120°, while the center of recess 51 is likewise spaced 120° from the center of recess 31 and the center of recess 41. Instead of having in recess 41 an S-shaped spring member of the type denoted by numeral 32, recess 41 has secured against opposite sides thereof (adjacent opposite ends of housing 25) a pair of wheel mounting pins or axles 45 opposite ends of which are secured against the adjacent end wall of recess 41 by the cone-shaped heads of a pair of screws 43. Rotatably mounted on each pin 45 intermediate the ends thereof is a ball bearing wheel 46, which is rotatable in a registering recess 47 formed in the adjacent end of the housing 25. The wheels 46, as shown in FIGS. 3 and 4, have rolling, point engagement with the outer peripheral surface of the guide rod 18. In the manners similar to that of the pins or axles 45, the recess 51 has secured therein adjacent opposite ends of housing 25 a pair of axles or pins 55, each of which is secured adjacent opposite ends thereof beneath the cone-shaped heads of a pair of screws 53 which secure the associated pin 55 in a stationary position at one end of the recess 51. Intermediate its ends each pin 55 has rotatably mounted thereon a ball bearing wheel which rotates in a registering recess 57 formed in the adjacent end of the housing 25. Each of the wheels 56 of the lens housing 25, as shown in FIG. 4, has rolling, point contact with the outer peripheral surface of the guide rod 19, as the housing 25 is shifted axially in barrel 10. Although not illustrated, it will be understood that housing 26 is guided by a similar pair of rollers that having rolling point contact with the guide rod 19.

From the foregoing it will be apparent that each of the housings 25 and 26 has rotatably mounted thereon three pairs of ball bearing wheels 36, 46 and 56, respectively, the wheels of each pair being rotatably mounted adjacent opposite ends, respectively, of each such housing. Moreover, only one pair of wheels, wheels 36, are spring-loaded into rolling engagement with the guide rod 17. The remaining two pairs of wheels, 46 and 56, however, are mounted to rotate on axles 45 and 55, respectively, which are secured against movement in the associated recesses 41 and 51.

Referring again to FIGS. 1 to 4, it will be noted that each housing 25 and 26 has projecting from the upper end thereof, as illustrated in the drawing, a cylindrically shaped guide pin 25' and 26', respectively, each of which pins projects slidably through an elongate guide slot 12' (FIG. 1) formed in section 12 of the lens barrel to extend longitudinally between opposite ends thereof. Pins 25' and 26' also extend at their outer ends slidably into a pair of near helically shaped cam grooves 61 and 62 (FIG. 1) formed in the inner peripheral surfaces of a pair of conventional zoom rings 63 and 64 that are mounted on section 12 of the lens barrel 10 for rotation relative thereto in a manner that will be known to one skilled in the art, to effect corresponding axial movements of the lens housings 25 and 26 in barrel 10.

From the foregoing it will be apparent that the present invention provides a very accurate and more inexpensive guide mechanism or means for repeatedly and accurately adjusting the zoom lenses of the type carried by housing 25 and 26 accurately to achieve the desired magnification and focus of the mechanism. The point contact between the guide rods 17–19 and the associated ball bearing wheels 36, 46 and 56 of the respective lens housings 25 and 26, provide simple, point contact between the wheels and the associated guide rods thereby reducing not only wear of the equipment during axial adjustment of the housings 25 and 26, but also reduces the effort required to make such adjustments. The guide rods 17–19 preferably are precision ground steel rods, thus providing extremely hard, smooth contact surfaces necessary for precision motion of housings 25 and 26 and they eliminate the need for providing a highly polished finish on the interior bore of barrel 10 as was previously required by known zoom lens mechanisms.

While this invention has been illustrated and described in detail in connection with only certain embodiments thereof, it will be apparent that it is capable of still further modification, and that this application is intended to cover any such modification as may fall within the scope of one skilled in the art, or the appended claims.

What is claimed is:

1. In a zoom lens having a tubular lens barrel, and a pair of cylindrical lens housings disposed coaxially in said barrel, an improved mechanism for mounting and guiding said housings for axial adjustment in the bore of said barrel, comprising a plurality of elongate, parallel rails secured in said bore of said barrel to extend axially thereof and in a predetermined angularly spaced relation to each other about the axis of said bore, means rotatably mounting on each of said housings a plurality of sets of rollers for rotation about spaced axes extending parallel to tangents to said housing, and having rolling engagement with said rails upon axial adjustment of said housings, said sets being equal in number to said rails and being in said predetermined angularly spaced relation to each other, and means interposed between said housings and said barrel and operative to prevent rotation of said housings relative to said barrel.

2. In a zoom lens as defined in claim 1, wherein said rails are circular in cross section, and said rollers have point contact with the circumferential surfaces of said rails.

3. In a zoom lens as defined in claim 1, wherein each of said cylindrical housings has in the outer peripheral surface thereof a plurality of angularly spaced recesses equal in number to and registering with said rails, and said mounting means includes means supporting at least one of said sets of said rollers in each of said recesses for rotation about spaced, parallel axes extending normal to the length of the rail with which said one set of rollers has rolling engagement.

4. In a zoom lens as defined in claim 3, wherein there are two of said rollers in each of said sets, and the two rollers of each of said sets are spaced from each other axially of the housing upon which they are rotatably mounted.

5. In a zoom lens as defined in claim 3, wherein said supporting means includes spring means in one of said recesses in each of said housings resiliently urging said at least one set of rollers therein into resilient engagement with a registering one of said rails.

6. In a zoom lens as defined in claim 5, wherein in another of said recesses in each of said housings said supporting means includes means mounting the set of rollers therein for rotation about axes fixed with respect to the associated housing.

7. In a zoom lens as defined in claim 1, including means securing said rails against the inner peripheral surface of said lens barrel, and in equi-angularly spaced relation to each other about the axis of said bore.

8. In a zoom lens as defined in claim 7, wherein said means interposed between said housings and said barrel comprises a pair of pins each of which is secured at one end to a different one of said housings and projects at its opposite end slidably into an elongate slot formed in said barrel to extend longitudinally thereof.

9. In a zoom lens as defined in claim 8, wherein each of said pins projects at said opposite end thereof through said slot in said barrel and slidably into a cam groove formed in a zoom ring rotatably mounted on said barrel for effecting axial adjustment of said housings in said barrel.

10. In a zoom lens as defined in claim 9, wherein said rails are circular in cross section, and said rollers have outer peripheral surfaces disposed in rolling, point contact with said rails.

11. In a zoom lens as defined in claim 9, wherein there are two zoom rings rotatably mounted on said barrel, and each of said pins has said opposite end thereof projecting slidably in a cam groove in a different one of said rings.

12. In a zoom lens as defined in claim 1, wherein there are three of said rails secured in said bore in equally angularly spaced relation to each other, and each of said housings has mounted thereon three of said sets of rollers with each of said three sets having rolling engagement with a different one of said three rails.

13. In a zoom lens as defined in claim 12, wherein each of said sets of rollers comprises two rollers mounted to rotate about a pair of spaced, parallel axes extending at right angles to the rod with which the two rollers are engaged.

14. In a zoom lens as defined in claim 12, including spring means supporting the rollers of one of said three sets of rollers on each of said housings for resilient engagement with one of said rails.

* * * * *